(12) United States Patent
Perrott

(10) Patent No.: US 6,503,035 B1
(45) Date of Patent: Jan. 7, 2003

(54) AUTOMOTIVE VEHICLE HAVING A STRUCTURAL REINFORCEMENT SYSTEM FOR VEHICLE TRANSPORT

(75) Inventor: J. Donald Perrott, Oshawa (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/001,951

(22) Filed: Nov. 2, 2001

(51) Int. Cl.[7] .................................................. B60P 7/08
(52) U.S. Cl. .............................. 410/23; 410/21; 410/96; 410/106; 410/109; 410/112
(58) Field of Search ........................... 410/96, 97, 106, 410/109, 110, 112, 113, 116, 10, 11, 19, 21, 22, 23; 244/118.1; 280/495, 504, 498; 248/499

(56) References Cited

U.S. PATENT DOCUMENTS

| | | | | |
|---|---|---|---|---|
| 2,322,576 A | * | 6/1943 | Huebshman et al. .......... | 410/23 |
| 2,970,850 A | * | 2/1961 | Blunden ....................... | 410/23 |
| 3,566,804 A | * | 3/1971 | Mietla .......................... | 410/11 |
| 4,022,134 A | * | 5/1977 | Krokos ......................... | 410/23 |
| 4,049,229 A | * | 9/1977 | Peisner ......................... | 410/11 |
| 4,369,010 A | * | 1/1983 | Ichinose et al. ............. | 410/101 |
| 4,580,935 A | * | 4/1986 | Treihaft .......................... | 410/3 |
| 4,606,687 A | * | 8/1986 | Mantela et al. ............... | 410/23 |
| 5,054,806 A | * | 10/1991 | Chester | |
| 5,180,262 A | * | 1/1993 | Westerdale .................. | 410/12 |
| 5,908,274 A | * | 6/1999 | Silberman .................... | 410/10 |

* cited by examiner

*Primary Examiner*—Stephen T. Gordon
(74) *Attorney, Agent, or Firm*—Jeffrey A. Sedlar

(57) ABSTRACT

An automotive vehicle having a structural reinforcement system for maintaining the integrity of the vehicle during aircraft transportation is disclosed. The structural reinforcement system includes a pair of cables attached to a body member and a pair of frame members of the vehicle. The cables divert loads placed upon the frame members by aircraft restraints to the body member.

18 Claims, 2 Drawing Sheets

AUTOMOTIVE VEHICLE HAVING A STRUCTURAL REINFORCEMENT SYSTEM FOR VEHICLE TRANSPORT

TECHNICAL FIELD

The present invention relates to a structural reinforcement system for maintaining the structural integrity of a rear portion of an automotive vehicle during aircraft transportation.

BACKGROUND OF THE INVENTION

Transportation of an automotive vehicle using aircraft (e.g., large military aircraft) generally requires that one or more restraints be applied to the vehicle to limit or prevent vehicle movement. In particular, aircraft transportation of an automotive vehicle typically requires that fastening members (e.g., shipping hooks) be provided at a rear extremity of the vehicle for attachment to aircraft restraints. During transportation, however, the restraints often apply undesirably large loads to portions of the vehicle connected to the fastening members. Thus, it is desirable to provide a structural reinforcement system for reinforcing the vehicle against such loads.

SUMMARY OF THE INVENTION

Accordingly, the present invention provides an automotive vehicle having a structural reinforcement system for maintaining the integrity of the vehicle during transportation of the vehicle by an aircraft. The vehicle includes a first frame member and a second frame member extending longitudinally with respect to the vehicle and extending adjacent an underbody of the vehicle. Each of the frame members includes an end portion adjacent a rear extremity of the vehicle. The vehicle also includes a body member extending laterally with respect to the vehicle and extending adjacent an upper seat back. The body member has a first end opposite a second end. A first high strength cable is connected to the first frame member adjacent the end portion of the first frame member and is connected to the body member adjacent the first end of the body member. A second high strength cable is connected to the second frame member adjacent the end portion of the second frame member and is connected to the body member adjacent the second end of the body member. Moreover, a first fastening member and a second fastening member are respectively attached to the first frame member and the second frame member. Each of the fastening members is attached to its respective frame member adjacent the respective end portions of the frame members and each of the fastening members is suitable for attachment to restraints of the aircraft.

BRIEF DESCRIPTION OF THE DRAWINGS

These and other objects, features, aspects, and advantages of the invention will become apparent upon consideration of the specification and appended drawings in which.

DESCRIPTION OF PREFERRED EMBODIMENT

Figure 1:
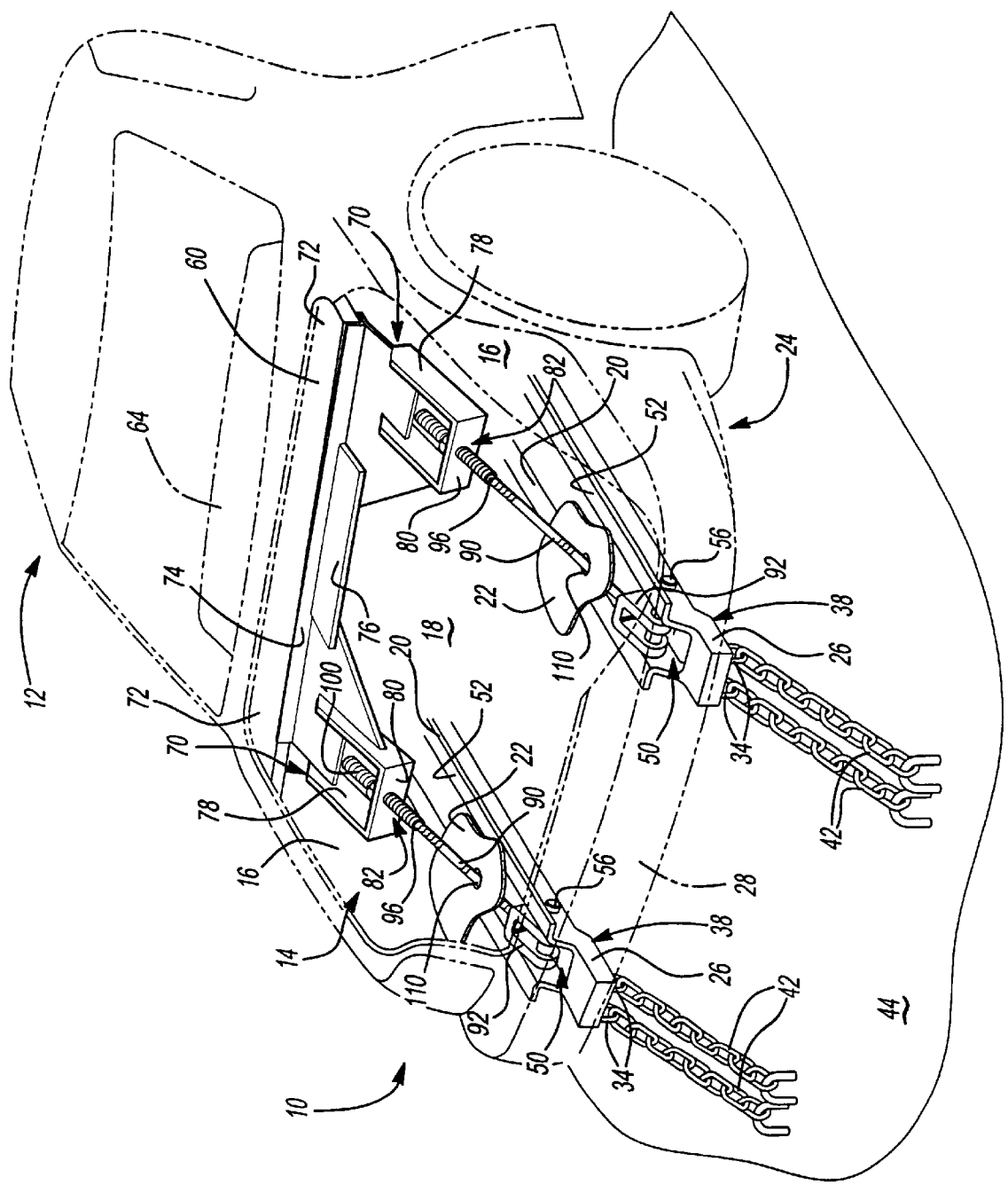
FIG. 1 is a perspective view of a rear portion of an automotive vehicle.
Figure 2:
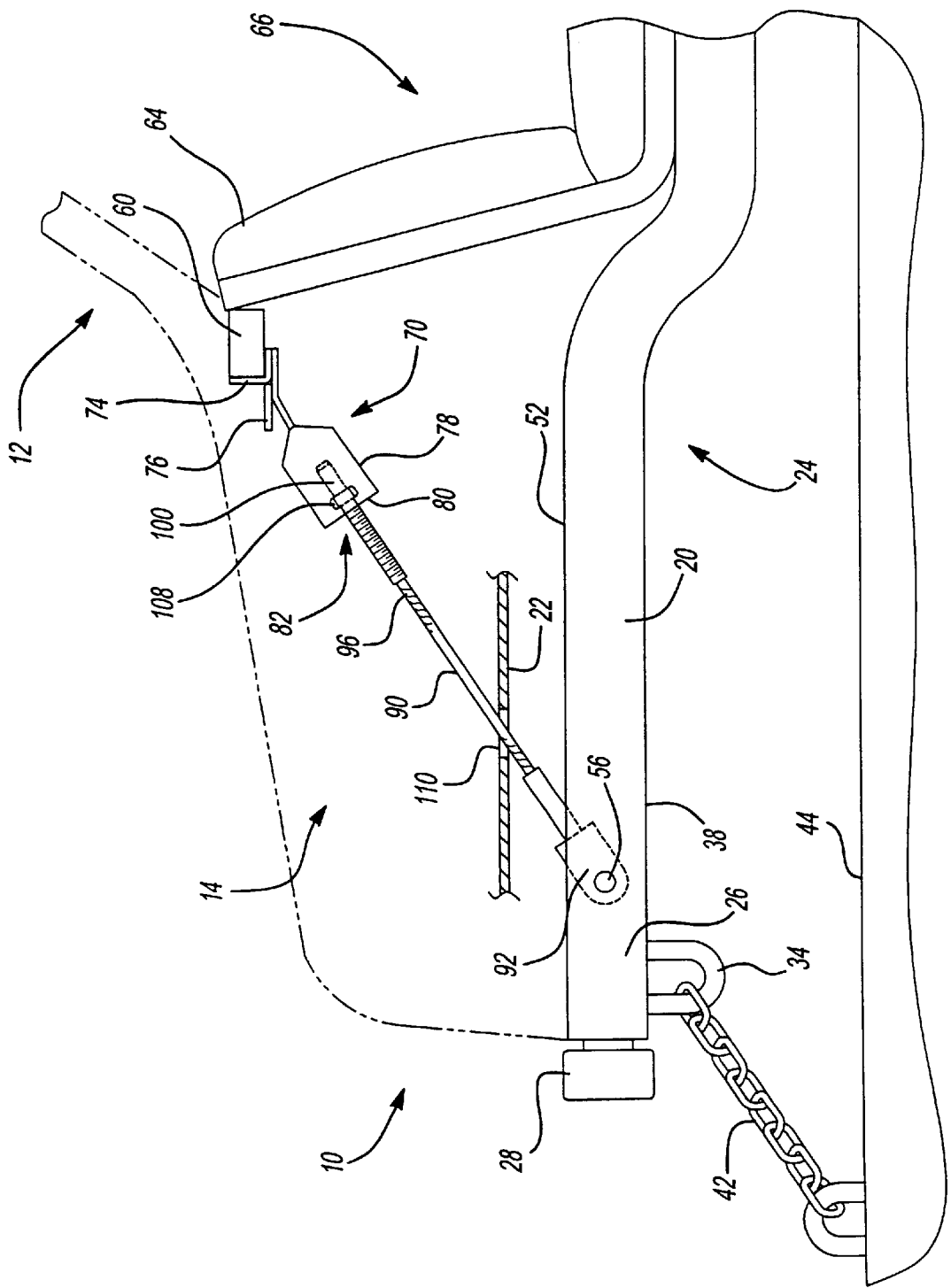
FIG. 2 is a side view of the rear portion of the automotive vehicle of FIG. 1.

Referring to FIGS. 1 and 2, there is illustrated a rear portion 10 of an automotive vehicle 12 having a structural reinforcement system 14 according to the present invention. The structural reinforcement system 14 is configured for maintaining the integrity of the rear portion 10 of the vehicle 12 during transport of the vehicle 12, particularly transport of the vehicle within an aircraft.

The rear portion 10 of the vehicle 12 includes opposing rear quarter panels 16 defining a trunk space 18 intermediate the quarter panels 16. The vehicle 12 includes a pair of frame members 20 (e.g., a pair of vehicle rail members) that are generally parallel to each other and extend longitudinally with respect to the vehicle 12. A bottom trunk panel 22 is disposed intermediate the frame members 20 and the trunk space 18 for further defining the trunk space 18.

The frame members 20 are located adjacent an underbody portion 24 of the vehicle 12 and adjacent the bottom trunk panel 22. Additionally, each of the frame members 20 includes an end portion 26 adjacent a rear extremity 28 (e.g., a rear bumper) of the vehicle 12.

A pair of fastening members 34 (e.g., metal u-shape members or shipping hooks) is attached to each of the frame members 20 adjacent the end portions 26 such as along a bottom surface 38. Preferably, each of the fastening members 34 is configured for attachment to restraints 42 (e.g., chains) that are secured to a floor 44 of an aircraft (not shown).

Walls of the frame members 20 define channels or cavities 50 within a top portion 52 of the frame members 20 adjacent the end portions 26. Preferably, rods 56 extend across the cavities 50 and are adapted for pivotally receiving a bracket.

The vehicle 12 includes a metal body member 60 that extends laterally with respect to the vehicle 12. Preferably, the body member 60 is metal and extends adjacent an upper portion 64 of a seat back 66 of the vehicle 12.

The structural reinforcement system 14 includes a pair of bracket assemblies 70 connected to the metal body member 60 adjacent opposing ends 72 of the body member 60. As shown, the bracket assemblies 70 are both formed with a first metal plate reinforcement member 74 that extends with and is attached (e.g., welded) to the body member 60. A second reinforcement member 76 is connected to the bracket assemblies 70 and to the first reinforcement member 74.

Each of the bracket assemblies 70 includes a substantially U-shaped bracket 78. Each of the brackets 78 includes a wall 80 generally configured to oppose the end portions 26 of the frame members 20. Preferably, the walls 80 include through-holes 82.

The structural reinforcement system 14 includes a pair of high tensile strength cables 90 adapted for connecting the end portions 26 of the frame members 20 to the body member 60. Each cable 90 is attached to the rod 56 of one of the frame members 20 with a clevis bracket 92. Toward an end 96 of the cable 90 opposite the clevis bracket 92, the cable 90 is integrally attached to a threaded bolt 100. The bolt 100 is received in the through-holes 82 of the brackets 78. Thus, a nut 108 can be threadably attached to the bolt 100 such that the nut 108 may be tightened to tension the cables 90 between the end portions 26 of the frame member 20 and the body member 60 or reinforcement member 74.

As shown, the cables 90 extend through the trunk space 18 to connect the body member 60 and the frame members 20. Moreover, the cables 90 preferably extend through through-holes 110 in the bottom trunk panel 22 for accessing the frame members 20.

In use, the vehicle 12 with the structural reinforcement system 14 is driven to a desired position on the floor 44 of the aircraft and the restraints 42 are attached to the fastening members 34 for limiting movement of the vehicle 12.

During aircraft transport of the vehicle 12, the restraints 42 exert loads upon the frame members 20 as the restraints 42 limit the movement of the vehicle 12. In turn, the frame members 20 distribute the loads to various portions of the vehicle 12.

Advantageously, the cables 90 divert at least a portion of the loads away from the rear extremity 28 of the vehicle 12 to the body member 60, the reinforcements 74, 76 or a combination thereof. This allows the body member 60, the reinforcements 70, 76 and portions of the vehicle 12 adjacent the body member 60 to assist in structurally reinforcing the vehicle 12 against the loads caused by the restraints 20 during aircraft transportation. Thus, the loads are distributed over a more diverse set of body and frame portions of the vehicle 12 to assist in maintaining the structural integrity of the rear portion 10 of the vehicle 12.

Preferably, and as best shown in FIG. 2, the cables 90 are also configured to substantially align with the restraints 42 and the bracket assemblies 70 such that the restraints 42, the cables 90 and the bracket assemblies 70 cooperatively extend diagonally at substantially the same angle from the floor 44 of the aircraft to the body member 60 of the vehicle 12. Such alignment can assist in eliminating moments that may be applied to the rear portion 10, the body member 60 or the frame members 20 of the vehicle 12.

Although the present invention may be applied to a vehicle having a body-on-frame construction (i.e., the body is manufactured separately from the frame and assembled thereto), it has been found that the structural reinforcement system 14 is particularly effective for maintaining vehicle integrity of a vehicle having a unibody construction (i.e. the body and frame of the vehicle are manufacture as a single integrated unit). Moreover, while this structural reinforcement system has particular utility in aircraft transportation, it is contemplated that the system may also be used with other transport vehicles such as trains, trucks and the like.

It should be understood that the invention is not limited to the exact embodiment or construction, which has been illustrated and described but that various changes may be made without departing from the spirit and the scope of the invention.

What is claimed is:

1. An automotive vehicle having a structural reinforcement system for maintaining the integrity of the vehicle during transportation of the vehicle by an aircraft, the vehicle comprising:
    a) a first frame member and a second frame member extending longitudinally with respect to the vehicle and extending adjacent an underbody of the vehicle, each of the frame members including an end portion adjacent a rear extremity of the vehicle;
    b) a body member extending laterally with respect to the vehicle and extending adjacent an upper seat back, the body member having a first lateral end opposite a second lateral end;
    c) a first high strength cable connected to the first frame member adjacent the end portion of the first frame member and connected to the body member adjacent the first end of the body member;
    d) a second high strength cable connected to the second frame member adjacent the end portion of the second frame member and connected to the body member adjacent the second end of the body member; and
    e) a first fastening member and a second fastening member, the first fastening member attached to the first frame member, the second fastening member attached to the second frame member wherein;
        i) each of the fastening members is attached to its respective frame member adjacent the respective end portions of the frame members; and
        ii) each of the fastening members is adapted for attachment to restraints of the aircraft.

2. An automotive vehicle as in claim 1 wherein the rear extremity of the vehicle is a rear bumper.

3. An automotive vehicle as in claim 1 wherein the first frame member and second frame member are vehicle rail members.

4. An automotive vehicle as in claim 1 further comprising a pair of rear quarter panels for at least partially defining a trunk space intermediate the quarter panels wherein the first cable and the second cable extend at least partially through the trunk space.

5. An automotive vehicle as in claim 4 wherein the first and second cables extend through holes in a bottom trunk panel, which at least partially defines the trunk space.

6. An automotive vehicle as in claim 1 wherein an end of both the first cable and the second cable are integrally attached to a threaded bolt.

7. An automotive vehicle as in claim 6 wherein the structural reinforcement system includes a first bracket assembly and a second bracket assembly for connecting the cables to the body member.

8. An automotive vehicle as in claim 7 wherein the first and second bracket assemblies include generally U-shaped brackets with walls having through-holes defined therein such that the bolts of the cables can be received within the through-holes of the walls and fastened to the brackets with nuts for tensioning the cables.

9. An automotive vehicle as in claim 7 wherein a reinforcement member is attached to the body member and to the bracket assemblies to assist in reinforcing the body member.

10. An automotive vehicle as in claim 1, wherein the first and second cables are respectively attached to the end portions of the first and second frame members with a bracket and a rod.

11. An automotive vehicle as in claim 1 wherein the cables are configured to substantially align with the restraints when the vehicle, is secured in the aircraft.

12. A structural reinforcement system for maintaining the integrity of an automotive vehicle during transportation of the vehicle by an aircraft, the structural reinforcement system comprising:
    a) a first high strength cable connected to a first frame member of the vehicle adjacent an end portion of the first frame member and connected to a body member of the vehicle adjacent a first end of the body member wherein the body member extends laterally with respect to the vehicle and extends adjacent an upper seat back of the vehicle;
    b) a second high strength cable connected to a second frame member of the vehicle adjacent an end portion of the second frame member and to the body member adjacent a second end of the body member wherein the first frame member and the second frame member extend longitudinally with respect to the vehicle and extend adjacent an underbody of the vehicle and wherein the end portions of the frame members are adjacent a rear extremity of the vehicle; and
    c) a first bracket assembly for connecting the cables to the body member
    d) a second bracket assembly for connecting the cables to the body member; and e) a reinforcement member attached to the body member and to the bracket assemblies to assist in reinforcing the body member.

13. A structural reinforcement system as in claim 12 wherein the first frame member and second frame member are vehicle rail members.

14. A structural reinforcement system as in claim 12 wherein the vehicle includes a pair of rear quarter panels for at least partially defining a trunk space intermediate the quarter panels and wherein the first cable and the second cable extend at least partially through the trunk space.

15. A structural reinforcement system as in claim 14 wherein the first and second cables extend through holes in a bottom trunk panel, which at least partially defines the trunk space.

16. A structural reinforcement system as in claim 12 wherein an end of both the first cable and the second cable are integrally attached to a threaded bolt.

17. A structural reinforcement system as in claim 12 wherein the cables are configured to substantially align with restraints when the vehicle in secured in the aircraft.

18. A structural reinforcement system as in claim 16 wherein the first and second bracket assemblies include generally U-shaped brackets with walls having through-holes defined therein such that the bolts of the cables can be received within the through-holes of the walls and fastened to the brackets with nuts for tensioning the cables.

* * * * *